United States Patent [19]

Nilssen

[11] Patent Number: 5,216,332
[45] Date of Patent: Jun. 1, 1993

[54] MAGNETIC-ELECTRONIC BALLAST FOR FLUORESCENT LAMPS

[76] Inventor: Ole K. Nilssen, Caesar Dr., Rte. 5, Barrington, Ill. 60010

[21] Appl. No.: 795,228

[22] Filed: Nov. 15, 1991

Related U.S. Application Data

[63] Continuation of Ser. No. 901,839, Aug. 28, 1986, abandoned, which is a continuation-in-part of Ser. No. 686,275, Dec. 26, 1984, abandoned, which is a continuation-in-part of Ser. No. 495,540, May 17, 1983, Pat. No. 4,554,487, which is a continuation-in-part of Ser. No. 411,263, Aug. 25, 1982, Pat. No. 4,461,980, said Ser. No. 901,839, is a continuation-in-part of Ser. No. 730,596, May 6, 1985, Pat. No. 4,855,860, which is a continuation-in-part of Ser. No. 640,240, Aug. 13, 1984, Pat. No. 4,563,719, which is a continuation of Ser. No. 412,771, Aug. 30, 1982, abandoned.

[51] Int. Cl.$^5$ ............................................. H05B 41/36
[52] U.S. Cl. .................... 315/224; 315/106; 315/209 R; 315/226; 315/DIG. 5
[58] Field of Search ............... 315/106, 107, 117, 118, 315/224, 225, 209 R, 226, DIG. 5

[56] References Cited

U.S. PATENT DOCUMENTS

| | | | |
|---|---|---|---|
| 4,256,992 | 3/1981 | Luursema | 315/106 |
| 4,451,767 | 5/1984 | Goralnik | 315/106 |
| 4,588,924 | 5/1986 | Luursema et al. | 315/107 |
| 4,642,521 | 2/1987 | Smulders | 315/106 |
| 4,661,745 | 4/1987 | Citino et al. | 315/107 |

Primary Examiner—David Mis

[57] ABSTRACT

A magnetic-electronic ballast consists of a symmetrical series-combination of two ordinary magnetic ballast reactors and an electronically controllable connection and cathode heating means; which connection/heating means has terminals by which to connect with two series-connected fluorescent lamps. The connection/heating means acts: i) to provide cathode heating prior to lamp ignition, ii) to constitute an open circuit as long as the lamps are properly operating, iii) to constitute a short circuit if ever any of the lamp cathode terminals were to be disconnected (or, if one of the cathodes were to become open-circuited), and iv) to cycle between a short circuit and an open circuit in case the lamps have become inoperable for reasons other than an open-circuited cathode. Hence, if one of the fluorescent lamps were to be disconnected from one of its sockets, the maximum voltage that could ever be provided at the lamp's other socket would be limited to half of 277 Volt; which is well within the maximum limits stipulated by U.L. as being acceptably safe.

22 Claims, 3 Drawing Sheets

MAGNETIC-ELECTRONIC BALLAST FOR FLUORESCENT LAMPS

This application is a Continuation of Ser. No. 06/901,839 filed Aug. 28, 1986, now abandoned.

Ser. No. 06/901,839 was a Continuation-in-Part of Ser. No. 06/686,275 filed Dec. 26, 1984, now abandoned; which was a Continuation-in-Part of Ser. No. 06/495,540 filed May 17, 1983, now U.S. Pat. No. 4,554,487; which was a Continuation-in-Part of Ser. No. 06/411,263 filed Aug. 25, 1982, now U.S. Pat. No. 4,461,980.

Ser. No. 06/901,839 was also a Continuation-in-Part of Ser. No. 06/730,596 filed May 6, 1985, now U.S. Pat. No. 4,855,860; which was a Continuation-in-Part of Ser. No. 06/640,240 filed Aug. 13, 1984, now U.S. Pat. No. 4,563,719; which was a Continuation of Ser. No. 06/412,771 filed Aug. 30, 1982 now abandoned.

BACKGROUND OF THE INVENTION

1. Field of Invention

The present invention relates to a high-efficiency magnetic reactor-type ballast, particularly of a kind operable to power two fluorescent lamps from a 277Volt/60Hz power line.

2. Prior Art

For reasons of cost-effectivity, electric power distribution in new commercial buildings is almost exclusively accomplished by way of a 277Volt/60Hz distribution voltage. At that voltage, ballasting of two 48" T-12 fluorescent lamps—which represent the most commonly used type of lamp combination/arrangement—could have been done by way of a simple reactor means; which would have led to a very efficient and cost-effective ballast. However, because of U.L. requirements relative to shock hazard safety, it is in reality not permissible to do the ballasting that way. As a consequence, a much more elaborate transformer-based ballast has to be used for powering two 48" T-12 fluorescent lamps from 277Volt/60Hz power line voltage.

Due to the substantial use of transformer action, a significant cost penalty and efficiency reduction result.

SUMMARY OF THE INVENTION

Objects of the Invention

An object of the present invention is that of providing for a magnetic-type fluorescent lamp ballasting means that is particularly efficient and cost-effective.

More specifically, an object of the present invention is that of providing a particularly simple and efficient magnetic-type ballast capable of powering two 48" T-12 fluorescent lamps from a 277Volt/60Hz power line.

These, as well as other objects, features and advantages of the present invention will become apparent from the following description and claims.

Brief Description

The present invention constitutes a ballast consisting of a symmetrical series-combination of two ordinary magnetic ballast reactors and an electronically controllable connection and cathode heating means; which connection/heating means has terminals by which to connect with two series-connected fluorescent lamps.

The connection/heating means acts: i) to provide cathode heating prior to lamp ignition, ii) to constitute an open circuit as long as the lamps are properly operating, iii) to constitute a short circuit if ever any of the lamp cathode terminals were to be disconnected (or, if one of the cathodes were to become open-circuited), and iv) to cycle between a short circuit and an open circuit in case the lamps have become inoperable for reasons other than an open-circuited cathode.

Hence, if one of the fluorescent lamps were to be disconnected from one of its sockets, the maximum voltage that could ever be provided at the lamp's other socket would be limited to half of 277 Volt; which is well within the maximum limits stipulated by U.L. as being acceptably safe.

DESCRIPTION OF THE PREFERRED EMBODIMENT

Details of Construction

Figure 1:
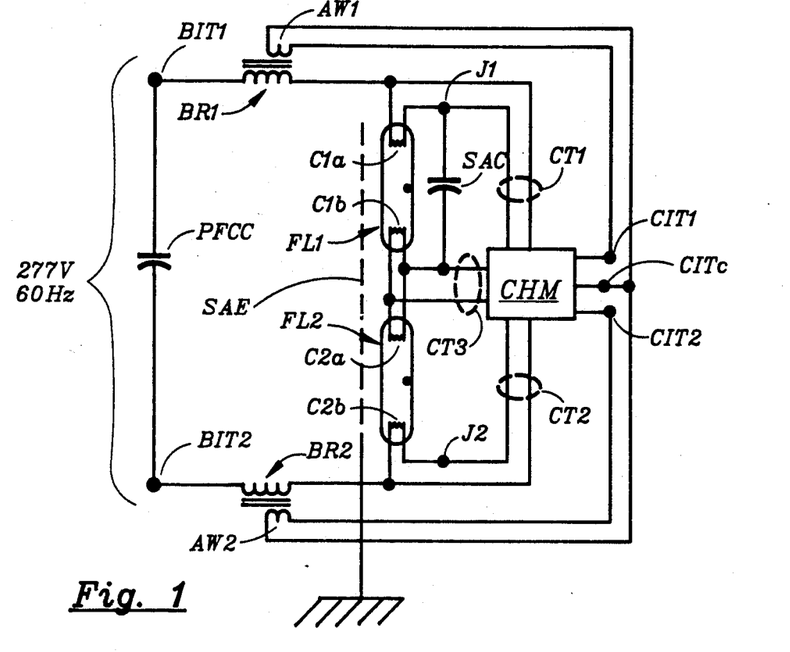
FIG. 1 provides a basic electrical circuit diagram of the preferred embodiment of the invention.

FIG. 1 schematically illustrates the electrical circuit arrangement of the preferred version of a 277Volt/60Hz reactor ballast for two ordinary 48" T-12 Rapid-Start fluorescent lamps.

In FIG. 1, a power line voltage of 277Volt/60Hz is applied between ballast input terminals BIT1 and BIT2; between which terminals is connected a power factor correction capacitor PFCC.

A first ballast reactor BR1 is connected in series with cathode C1$a$ of fluorescent lamp FL1 to form a first series-combination, and this series-combination is connected between ballast input terminal BIT1 and a junction J1.

A second ballast reactor BR2 is connected in series with cathode C2$b$ of fluorescent lamp FL2 to form a second series-combination, and this series-combination is connected between ballast input terminal BIT2 and a junction J2.

A starting aid capacitor SAC is connected between one of the terminals of cathode C1$a$ and one of the terminals of cathode C1$b$; and a ground-connected starting aid electrode SAE is positioned adjacent the two fluorescent lamps FL1 and FL2.

A connection and cathode heating means (hereinafter sometimes referred to as "connection/heating means") CHM has three pairs of connect terminals: i) a first pair CT1 connected with cathode Ca1, ii) a second pair CT2 connected with cathode C2$b$, and iii) a third pair CT3 connected with the parallel-combination of cathodes C1$b$ and C2$a$.

Connection/heating means CHM also has control input terminals CIT1, CITc and CIT2, where terminals CIT1 and CITc are connected with the terminals of an auxiliary winding AW1 on ballast reactor BR1, and where terminals CIT2 and CITc are connected with the terminals of an auxiliary winding AW2 on ballast reactor BR2.

Figure 2:
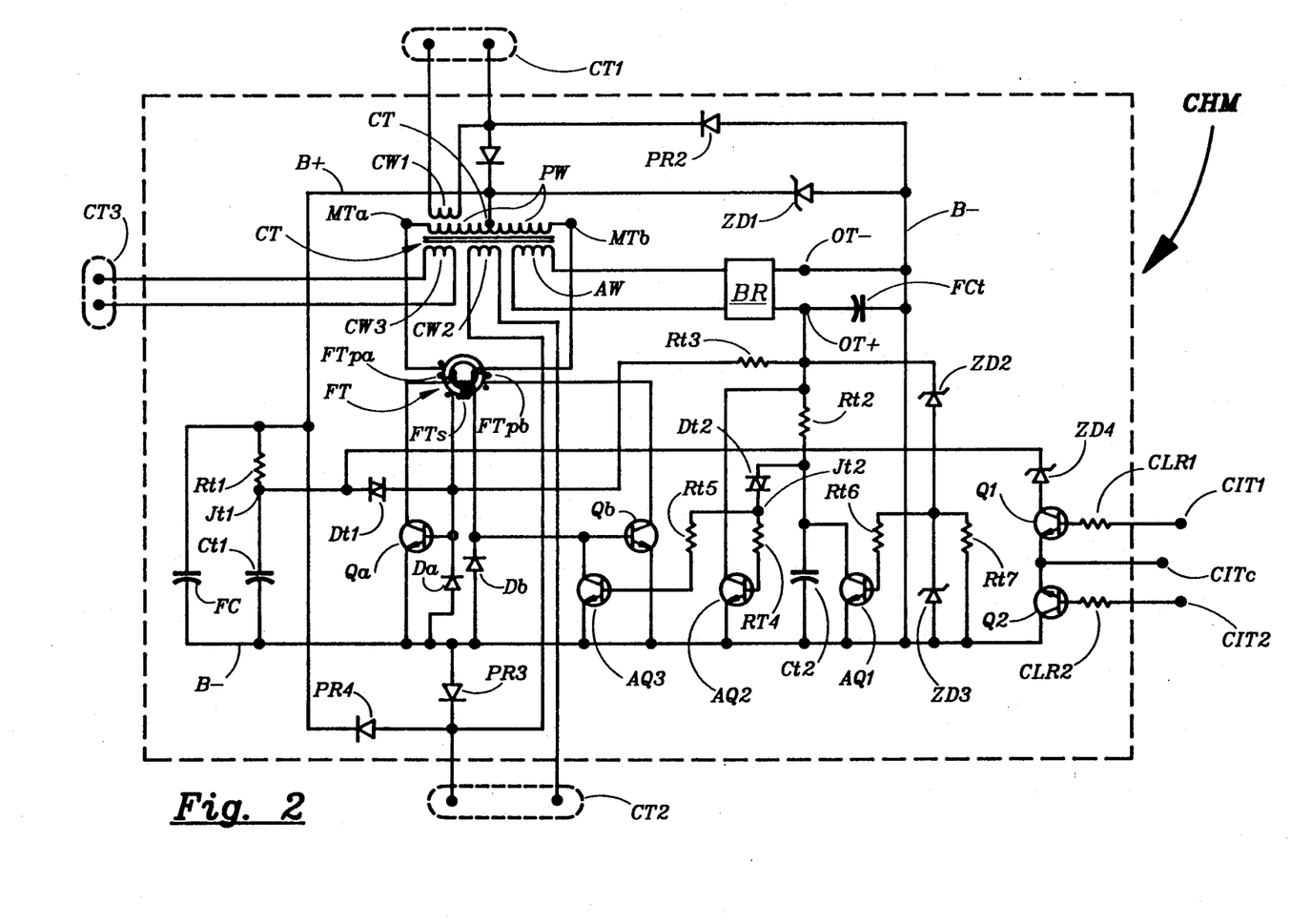
FIG. 2 provides details of the connection and cathode heating means used in the circuit of FIG. 1.

FIG. 2 provides details of the connection/heating means CHM of FIG. 1.

In FIG. 2, one of the CT1 terminals is connected with the anode of a first power rectifier PR1 and with the cathode of a second power rectifier PR2. The cathode of PR1 is connected with a B+ bus; and the anode of PR2 is connected with a B− bus.

A first Zener diode ZD1 is connected with its cathode to the B+ bus and with its anode to the B− bus.

One of the CT2 terminals is connected with the cathode of a third power rectifier PR3 and with the anode of a fourth power rectifier PR4. The anode of PR3 is connected with the B− bus; and the cathode of PR4 is connected with the B+ bus.

The terminals of a first cathode winding CW1 on a current transformer CT are connected with the CT1 terminals; and the terminals of a second cathode winding CW2 on transformer CT are connected with the CT2 terminals. The terminals of a third cathode winding CW3 are connected with the CT3 terminals.

Current transformer CT has a primary winding PW with a center-tap CT and main terminals MTa and MTb. Center tap CT is connected with the B+ bus.

Current transformer CT also has an auxiliary winding AW connected with the input terminals of a bridge rectifier BR. The negative output terminal OT− of rectifier BR is connected with the B− bus. The positive output terminal OT+ of rectifier BR is connected with the cathode of a second Zener diode ZD2, whose anode is connected with the cathode of a third Zener diode ZD3. The anode of ZD3 is connected—by way of the B− bus—with negative output terminal OT− of rectifier BR. A filter capacitor FCt is connected between the OT+ and OT− terminals.

The collector of a transistor Qa is connected with main terminal MTa by way of primary winding FTpa of a saturable current feedback transformer FT; and the collector of a transistor Qb is connected with main terminal MTb by way of primary winding FTpb of feedback transformer FT.

The terminals of a secondary winding FTs of feedback transformer FT are connected between the bases of transistors Qa and Qb. The cathode of a diode Da is connected with the base of transistor Qa; and the cathode of a diode Db is connected with the base of transistor Qb. The anodes of diodes Da and Db are both connected with the B− bus.

A resistor Rt1 is connected between the B+ bus and a junction Jt1. A capacitor Ct1 is connected between junction Jt1 and the B− bus. A first Diac Dt1 is connected between junction Jt1 and the base of transistor Qa.

A filter capacitor FC is connected between the B+ bus and the B− bus.

An NPN transistor Q1 is connected with its collector to the anode of a fourth Zener diode ZD4 and with its emitter to the emitter of a PNP transistor Q2, whose collector is connected with the B− bus. The base of transistor Q1 is connected with control input terminal CIT1 by way of a current-limiting resistor CLR1; and the base of transistor Q2 is connected with control input terminal CIT2 by way of current-limiting resistor CLR2. Common control input terminal CITc is connected with the emitters of both transistors Q1 and Q2. The cathode of Zener diode ZD4 is connected with junction Jt1.

A resistor Rt2 is connected between the OT+ terminal of rectifier BR and the collector of a first auxiliary transistor AQ1, whose emitter is connected with the B− bus; and a resistor Rt3 is connected between the OT+ terminal and the base of transistor Qa.

A capacitor Ct2 is connected between the collector of transistor AQ1 and the B− bus; and a second Diac Dt2 is connected between the collector of transistor AQ1, and a junction Jt2. A resistor Rt4 is connected between junction Jt2 and the base of a second auxiliary transistor AQ2; and a resistor Rt5 is connected between junction Jt2 and the base of a third auxiliary transistor AQ3.

A resistor Rt6 is connected between the cathode of Zener diode ZD3 and the base of transistor AQ1; and a resistor Rt7 is connected between the cathode of Zener diode ZD3 and the B− bus.

Figure 3:
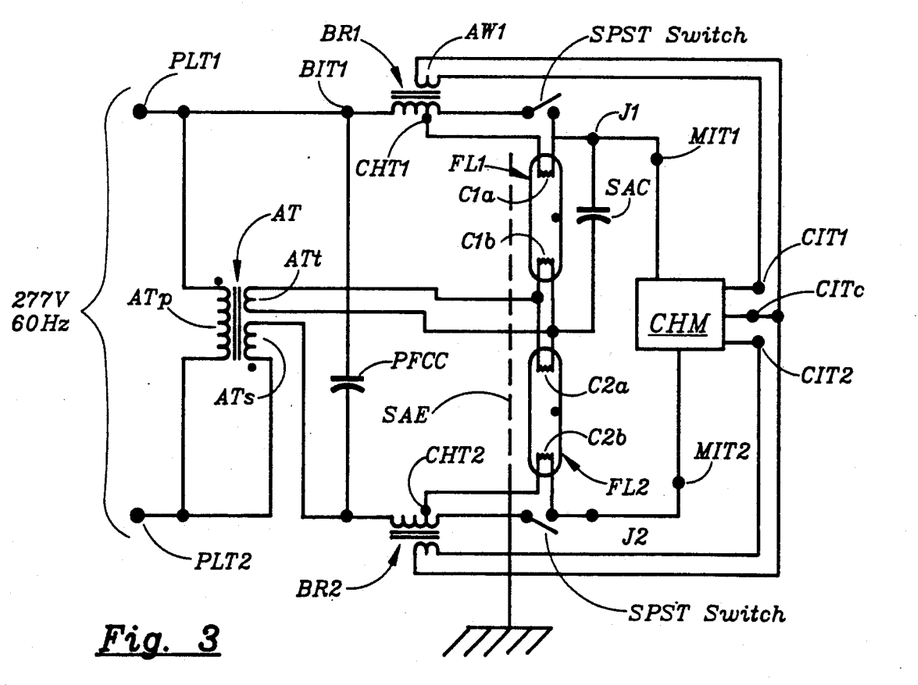
FIG. 3 provides the circuit diagram of a modification of the preferred arrangement.

FIG. 3 schematically illustrates the electrical circuit arrangement of a modified version of the preferred embodiment.

In FIG. 3, the terminals of primary winding ATp of an autotransformer AT is connected directly between the power line terminals PLT1 and PLT2 of the 277Volt/60Hz power line. Power line terminal PLT1 is connected with ballast input terminal BIT1; but power line terminal PLT2 is connected with ballast input terminal BIT2 by way of a secondary winding ATs on auto transformer AT.

A tertiary winding ATt is connected directly with the parallel-combination of cathodes C1b and C2a of fluorescent lamps FL1 and FL2, respectively.

Power factor correction capacitor PFCC is connected between ballast input terminals BIT1 and BIT2.

A first ballast reactor BR1 has a cathode heater tap CHT1 and is connected between ballast input terminal BIT1 and a junction J1. The terminals of cathode C1a are connected between cathode heater tap CHT1 and junction J1.

A second ballast reactor BR2 has a cathode heater tap CHT2 and is connected between ballast input terminal BIT2 and a junction J2. The terminals of cathode C2b are connected between cathode heater tap CHT2 and junction J2.

A starting aid capacitor SAC is connected between junction J1 and one of the terminals of cathode C1b; and a ground-connected starting aid electrode SAE is positioned adjacent the two fluorescent lamps FL1 and FL2.

A connection/heating means CHM' has two main input terminals MIT1 and MIT2 connected with junctions J1 and J2, respectively. Connection/heating means CHM' also has control input terminals CIT1, CITc and CIT2; where terminals CIT1 and CITc are connected with the terminals of an auxiliary winding AW1 on ballast reactor BR1, and where terminals CIT2 and CITc are connected with the terminals of an auxiliary winding AW2 on ballast reactor BR2.

Figure 4:
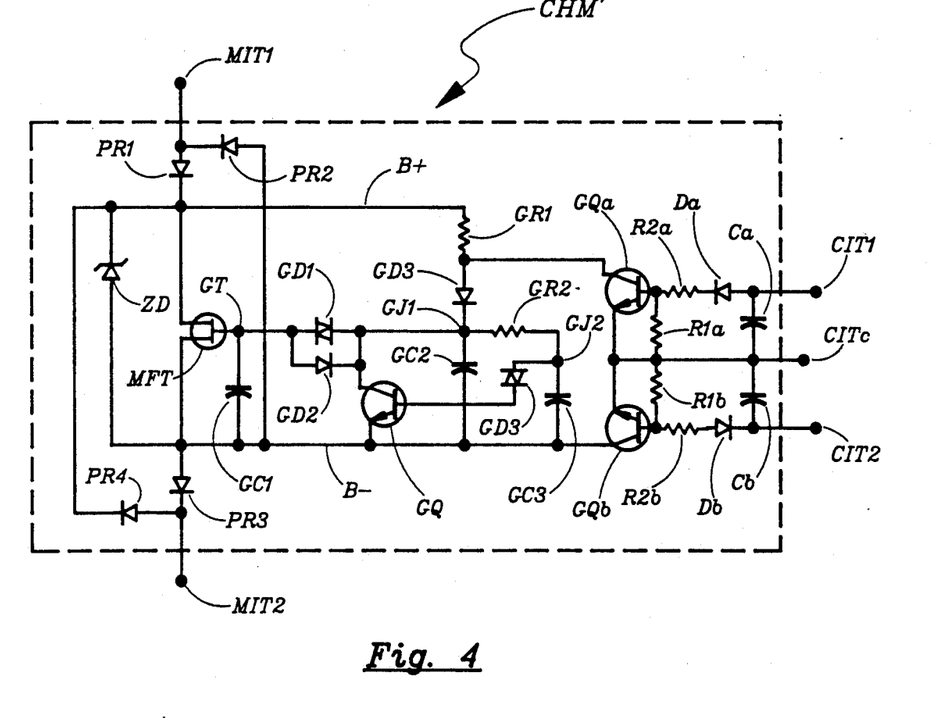
FIG. 4 provides details of the connection/heating means used in the circuit of FIG. 3.

FIG. 4 provides details of connection/heating means CHM' of FIG. 3.

In FIG. 4, terminal MIT1 is connected with the anode of a first power rectifier PR1 and with the cathode of a second power rectifier PR2. The cathode of PR1 is connected with a B+ bus; and the anode of PR2 is connected with a B− bus.

Terminal MIT2 is connected with the cathode of a third power rectifier PR3 and with the anode of a fourth power rectifier PR4. The anode of PR3 is connected with the B− bus; and the cathode of PR4 is connected with the B+ bus.

A Zener diode ZD is connected with its cathode to the B+ bus and with its anode to the B− bus.

The drain terminal and the source terminal of a MOSFET transistor MFT are connected with the B+ and the B— bus, respectively. A capacitor GC1 is connected between gate terminal GT of MFT and the B— bus; and a Diac GD1 is connected between gate terminal GT and a junction GJ1. Another capacitor GC2 is connected between junction GJ1 and the B— bus.

A transistor GQ has its collector connected with junction GJ1 and its emitter connected with the B— bus. A diode GD2 is connected with its anode to gate terminal GT and with its cathode to the collector of transistor GQ.

A resistor GR1 is connected between the B+ bus and the anode of a diode GD3, whose cathode is connected with junction GJ1. Another resistor GR2 is connected between junction GJ1 and another junction GJ2; and another Diac GD3 is connected between junction GJ2 and the base of transistor GQ. A capacitor GC3 is connected between junction GJ2 and the B— bus.

An NPN transistor GQa is connected with its collector to the anode of diode GD3 and with its emitter to the emitter of a PNP transistor GQb, whose collector is connected with the B— bus.

A resistor R1a is connected between the base and the emitter of transistor GQa; another resistor R2a is connected between the base of transistor GQa and the cathode of a diode Da; the anode of diode Da is connected with control input terminal CIT1; and a capacitor Ca is connected between the cathode of diode Da and control input terminal CITc.

A resistor R1b is connected between the base and the emitter of transistor GQb; another resistor R2b is connected between the base of transistor GQb and the cathode of a diode Db; the anode of diode Db is connected with control input terminal CIT2; and a capacitor Ca is connected between the cathode of diode Db and control input terminal CITc.

Details of Operation

In FIG. 1, when initially the 277Volt/60Hz power line voltage is applied between ballast input terminals BIT1 and BIT2, it will as well appear between the CT1 and the CT2 terminal pairs of connection/heating means CHM. As explained subsequently in connection with FIG. 2, with the power line voltage present between the CT1/CT2 terminal pairs, an effective short circuit will develop between these terminal pairs within about 25 milli-seconds.

This short circuit condition will last for about 1.5 second; and during this period a short circuit current flows between the CT1/CT2 terminal pairs. The magnitude of this short circuit current is limited by the combined reactance of the two ballast reactors.

While the short circuit condition exists, cathode power is being provided to all the cathodes of the fluorescent lamps, thereby bringing the cathodes to incandescence and preparing the lamps for proper Rapid-Start ignition.

After about 1.5 second has passed, the short circuit between the CT1/CT2 terminal pairs ceases to exist and is replaced with an open circuit. Thus, the full 277Volt/60Hz line voltage is provided directly across the fluorescent lamps, whose cathodes are now fully incandescent. Given the starting aid capacitor and the starting aid electrode, the lamps will therefore ignite in a normal Rapid-Start manner.

If the lamps were to fail to ignite, however, the short circuit between the CT1/CT2 terminal pairs would reappear within about 25 milli-seconds; whereafter, until lamp ignition, the connection between the CT1/CT2 terminal pairs would repetitively alternate between being a short circuit for about 1.5 second and an open circuit for about 25 milli-seconds.

If a lamp were to be disconnected from even one of the terminals connecting with one of its cathodes (i.e., if but a single cathode heating circuit were to become open-circuited), connection heating means CHM would—within about 25 milli-seconds —enter a state whereby a continuous short circuit connection would exist between the CH1/CH2 terminal pairs.

Thus, if a lamp were to be removed from one of its sockets, connection/heating means CHM would cause an effective short circuit connection to be placed between the two ballast reactors; which, in turn, would limit the magnitude of the voltage appearing at any of the lamp sockets to about half of 277 Volt, thereby significantly reducing electric shock hazard as compared with a situation where the two ballast reactors were not to have been so connected together.

Details on the operation of connection/heating means CHM are provided in FIG. 2.

Shown in FIG. 2 is a situation wherein any voltage provided between the CT1/CT2 terminal pairs is full-wave rectified and applied between a B+ bus and a B— bus, and wherein a high frequency push-pull inverter—which principally consists of switching transistors Qa and Qb and saturable positive feedback transformer FT—is powered by the resulting DC voltage.

When the 277Volt/60Hz power line voltage is initially applied to the ballast input terminals, the power line voltage is applied between the CT1/CT2 terminal pairs. The DC voltage developing between the B+ bus and the B— bus then becomes the full-wave-rectified equivalent of 277Volt/60Hz.

With full-wave-rectified 277Volt/60Hz present between the B+ bus and the B— bus, current starts flowing through resistor Rt1, thereby causing the voltage on capacitor Ct1 to gradually increase. In about 25 milli-seconds, the magnitude of the voltage on capacitor Ct1 reaches the point at which it causes Diac Dt1 to break down, thereby providing a trigger pulse to the base of transistor Qa.

This trigger pulse initiates self-oscillating inverter action, thereby causing current from the DC supply voltage to alternatingly flow through the two halves of primary winding PW of current transformer CT. The magnitude of the DC current allowed to flow into the center-tap of transformer CT is limited by the reactance of the two ballast reactors to about 0.5 Ampere.

The magnitude-limited DC current alternatingly provided to the two halves of the primary winding of current transformer Ct gets transformed into a high-frequency AC current; which, in turn, is applied to the various loads connected with current transformer CT by way of the various secondary windings CW1, CW2, CW3 and AW.

If none of the fluorescent lamp cathodes are connected with their respective CW1/CW2/CW3 windings, all the resulting high-frequency AC current will be rectified by bridge rectifier BR and applied to the two series-connected Zener diodes ZD2 and ZD3. Thus, These Zener diodes provide for a maximum limitation on the output voltage of current transformer CT.

However, with all the cathodes properly connected, current transformer CT will be loaded to such a degree that no current will flow through the Zener diodes.

As soon as the inverter starts to self-oscillate, a filtered DC voltage will appear at the output of bridge rectifier BR; and this voltage is then used for maintaining oscillations by way of providing a positive bias to the bases of power transistors Qa and Qb by way of resistor Rt3. That way, as the inverter ceases to oscillate during the brief periods when the magnitude of the DC supply voltage falls to near-zero magnitude between half-cycles of the 277Volt/60Hz power line voltage, reinitiation of inverter oscillation is sure to take place as soon as the magnitude of the DC supply voltage increases again.

As soon as the DC voltage appears at the output of bridge rectifier BR, the voltage on capacitor Ct2 starts to increase; and, after about 1.5 second, the voltage on Ct2 reaches a magnitude high enough to cause Diac Dt2 to break down. As soon as Diac Dt2 breaks down, a current pulse is provided to each of the bases of transistors AQ2 and AQ3, thereby momentarily causing these transistors to become highly conductive.

Being highly conductive, transistor AQ3 provides an effective short circuit between the base and the emitter of transistor Qb, thereby briefly stopping the inverter's oscillation. Similarly, transistor AQ2 rapidly discharges filter capacitor FCt; which discharging is accomplished before transistor AQ3 emerges from its state of being an effective short circuit. Thus, the inverter will indeed stop its oscillations and will remain in a non-oscillating state until receiving a new trigger pulse by way of Diac Dt1.

In other words, the inverter can be triggered into a latched state of self-oscillation, as well as triggered out of this latched state of self-oscillation.

After having received cathode heating power for a period of about 1.5 second, the cathodes of lamps FL1/FL2 have become thermionic, thereby making the lamps ready to ignite. Thus, at the point when the inverter is triggered out of oscillation, the lamps are indeed pre-conditioned and ready for Rapid-Start ignition.

When the inverter is triggered out of oscillation, but before the lamps have ignited, the magnitude of the voltage between the CT1/CT2 terminal pairs will increase to about 277 Volt, which is indeed a magnitude appropriate for Rapid-Starting of two series-connected F40 T-12 fluorescent lamps. In fact, because they are pre-conditioned (i.e., already having their cathodes thermionic), the lamps will Rapid-Start within a period shorter than about 25 milli-seconds.

As soon as the lamps ignite, lamp current will start flowing through the two ballast reactors, thereby providing voltage outputs from auxiliary windings AW1/AW2 of ballast reactors BR1/BR2; which voltage is operative within about 10 milli-seconds to cause both transistors Q1 and Q2 to become conductive, thereby—by action of Zener diode ZD4—preventing capacitor Ct1 from reaching a voltage high enough to cause Diac Dt1 to break down.

In other words, the presence of current through both ballast reactors is operative to prevent the inverter from ever being triggered into oscillation.

Thus, normally, after the initial 1.5 second period of the existence of an effective short circuit between the CT1/CT2 terminal pairs, the lamps ignite and remain ignited until the 277Volt/60Hz power line voltage is removed, or until one of the lamps is removed or ceases to function properly.

If a lamp is removed, if even from just one of its sockets, the flow of current through at least one of the ballast reactors will disappear; which means that at least one of transistors Q1 or Q2 will cease being conductive. As a result, nothing now prevents a trigger pulse from being applied to the base of transistor Qa; which means that, within about 25 milli-second after a lamp has been removed from one of its sockets, an effective short circuit is re-established between the CT1/CT2 terminal pairs, thereby re-establishing the flow of cathode power.

However, with at least one of the cathodes being disconnected, the amount of power being absorbed by the lamp cathodes from current transformer CT is reduced in comparison with the situation of having all four cathodes connected; which means that the DC voltage developing at the output of bridge rectifier BR reaches a magnitude that is distinctly higher than be the case with all four cathodes connected. As a result, by suitable choice of parameters, current starts flowing through the two series-connected Zener diodes ZD2 and ZD3, thereby biasing the base of transistor AQ1 in such a direction as to make this transistor conductive.

With transistor AQ1 conductive, the voltage on capacitor Ct2 can not reach a level high enough for Diac Dt2 to break down, thereby preventing the oscillating inverter from being triggered out of oscillation.

Thus, within about 25 milli-seconds after having disconnected one of the lamp cathodes, a short circuit gets established between the CT1/CT2 terminal pairs; and this short circuit then remains in effect for as long as the one cathode remains disconnected.

With reference to FIG. 1, it is then seen that—with a short circuit in effect between junctions J1 and J2—the magnitude of the voltage that can exist at any of the lamp terminals can not exceed half of 277 Volt with respect to either of the power line terminals or with respect to ground; which, in accordance with present test and evaluation practices by Underwriters Laboratories, is low enough to be considered relative safe from electric shock hazard to persons servicing a lighting apparatus having ordinary lamp sockets and using ordinary fluorescent lamps.

In FIG. 3, when the 277Volt/60Hz line voltage is applied to auto-transformer AT, about 300Volt/60Hz is applied across the ballast input terminals. As a result of this slightly stepped-up voltage, lamp starting and operation is facilitated, especially for some types of fluorescent lamps.

(Of course, a voltage step-up transformer may just as well be used with the ballast arrangement of FIG. 1.)

Under normal circumstances, when initially the 300Volt/60Hz is applied between the ballast terminals BIT1/BIT2 of FIG. 3, terminals MIT1 and MIT2 of connect/heating means CHM' represent an open circuit; and the full 300 Volt is then applied across the two lamps. However, this open circuit condition will only last for about 25 milli-second; whereafter a short circuit will suddenly develop between the MIT1/MIT2 terminals. This short circuit condition will last for about 1.5 second; which is the time it normally takes for the lamp cathodes to become thermionic. After this 1.5 second period, the open circuit condition is re-established, by which time the cathodes have become thermionic, and the lamps therefore ignite.

However, if the lamps were to fail to ignite, the short circuit condition becomes re-established within about 25 milli-seconds; whereafter, until the lamps do indeed ignite, connection/heating means CHM'—by way of its MIT1/MIT2 terminals—will repetitively alternate between being a short circuit for 1.5 second and an open circuit for about 25 milli-seconds.

As soon as the lamps ignite, lamp current will flow through both ballast reactors BR1 and BR2; and the presence of current flow through both of these ballast reactors sends a signal to CHM'—by way of the CIT1-/CITc/CIT2 terminals—to prevent the short circuit condition from becoming re-established.

If, however, the lamp is disconnected at one of its cathode connect terminals, lamp current will cease to flow through at least one of the ballast reactors; which means that the control signal to the CIT1/CITc/CIT2 terminals becomes disrupted enough to permit connection/heating means CHM' to start its cyclical alternation between being a short circuit for 1.5 second and an open circuit for about 25 milli-seconds.

Hence, in an actual lighting fixture using the ballast arrangement of FIG. 3, if a lamp is removed from one of its lamp sockets, the voltage provided at any of the lamp sockets will be no higher than about 154 Volt RMS; which magnitude results from the alternating presence of half of 300 Volt during each 1.5 second period and the full 300 Volt for each 25 milli-second period.

In contrast with the arrangement of FIG. 1, the arrangement of FIG. 3 provides continuous cathode heating; which continuous heating is accomplished by the ATt winding on transformer AT as well as by the AW1/AW2 windings on the two ballast reactors. Clearly, it would be feasible to provide all the cathode heating from secondary windings on the AT transformer, or from secondary windings on the ballast reactors.

By providing all the cathode heating by way of secondary windings on the ballast reactors, a degree of energy saving can be accomplished by sizing the cathode power provided during the 1.5 second short circuit period to a level just sufficient for Rapid-Starting of the lamps. Then, during normal lamp operation, the amount of cathode power will be lower than that normally used for Rapid-Start lamps. This is so because the magnitude of the current flowing through the ballast reactors is larger during the 1.5 second short circuit period that it is during normal lamp operation.

FIG. 4 provides details of the connection/heating means CHM' used in the arrangement of FIG. 3.

In FIG. 4, the full-wave-rectified 300Volt/60Hz voltage is provided between a B+ bus and a B− bus; across which a MOSFET transistor is connected.

As soon as the rectified 300Volt/60Hz power line voltage appears between the B+ bus and the B− bus, the voltage on capacitor GC2 starts to increase in magnitude. After about 25 milli-seconds, the voltage on capacitor GC2 reaches a magnitude large enough to cause Diac GD1 to break down; which then causes the voltage on capacitor GC1—and thereby between the gate terminal and the source terminal of transistor MFT—to increase abruptly to a level high enough to cause transistor MFT to become highly conductive. With transistor MFT being highly conductive, an effective short circuit will develop between the MIT1/MIT2 terminals; but the resulting short circuit current will be limited by the two ballast reactors to about 0.5 Ampere.

About 1.5 second later, the voltage on capacitor GC3 has increased enough to cause Diac GD3 to break down; which, in turn, makes transistor GQ conductive enough to discharge capacitor GC2 as well as—by way of diode GD2—capacitor GC1. Thus, at that point the gate voltage on transistor MFT falls to near zero, and transistor MFT is switched OFF; which is to say that it ceases to be conductive.

Now, with an open circuit circuit existing between the MIT1/MIT2 terminals, the voltage between these terminals increases to the full 300 Volt level; and the lamps—having thermionic cathodes by now ignite in Rapid-Start manner.

As soon as lamp current starts flowing through the two ballast reactors, both transistors GQa and GQb are rendered conductive, thereby preventing capacitor CG2 from being charged. Thus, as long as current flows in both ballast reactors, connection/heating means CHM' is prevented from re-entering its short circuit mode. However, if current ceases to flow through one (or both) of the ballast reactors, capacitor GC2 will not be prevented from charging; and the short circuit mode will then rapidly re-occur.

Thus, if a lamp is removed from a socket in a lighting fixture having the ballast arrangement of FIG. 3, the voltage then appearing at any of the remaining sockets will be limited in magnitude to 154 Volt RMS with respect to ground; which magnitude is normally considered by U.L. as being relatively safe from electric shock hazard for a person servicing a lighting fixture for 48" T-12 fluorescent lamps.

Additional Comments a) In connection with the circuit arrangement of FIG. 4, it is noted that the breakdown voltage of Diac GD3 should be of lower magnitude than that of Diac GD1.

b) In connection with the arrangement of FIG. 3, it is noted that the direct connection between junction J1 and ballast reactor BR1, as well as the direct connection between junction J2 and ballast reactor BR2, may both be totally removed by opening the two SPST switches; in which case significant efficiency improvement will occur since 50% of the cathode heating power will then be removed during normal lamp operation. However, the electric shock hazard protection will then have been somewhat modified.

Of course, for proper Rapid-Start ignition, initial lamp cathode heating power will still be provided by way of the short circuit current flowing through connection/heating means CHM' when it exists in its short circuit mode. However, this cathode heating current will be removed as soon as CHM' exits from its short circuit mode.

(Note: SPST stands for Single Pole Single Throw.)

c) The basic function of connection/heating means CHM, as well as that of connection/heating means CHM', is that of acting as an intermittently interrupted short circuit, except when lamp current flows through the two ballast reactors.

d) The basic principle of electric shock hazard prevention herein employed is somewhat analogous to ground fault detection and prevention.

That is, as long as current if flowing through both ballast reactors, it may reasonably be assumed that no ground-fault condition exist; whereas, if current flows through only one of the ballast reactors, it may reasonably be assumed that a ground-fault condition does indeed exist.

The typical ground-fault condition taking place in connection with servicing of a fluorescent lighting fixture involves a situation wherein a ground-connected person holds on to one end of a fluorescent lamp while the other end of the lamp is inserted into a lamp socket. In such a case, current might flow through the lamp and the person to ground; which would represent a typical ground-fault condition. In such a case, however, current would not be flowing in both ballast reactors —regardless of the manner in which the ballast terminals might be connected with the power line terminals.

Thus, the present invention comprises the concept of using a pair of ballast reactors as ground-fault detector means in addition to their basic current-limiting function.

e) It is noted that CHM of FIG. 1 exhibits three distinctly different modes: i) a first mode in which it alternates between: a) a first state wherein there exists an effective short circuit between the main terminals (i.e., terminal pairs CT1/CT2 of FIG. 1), and b) a second state in which there exists an effective open circuit between these main terminals; ii) a second mode wherein there exists an open circuit between the main input terminals; and iii) a third mode wherein there exists a continuous short circuit between the main input terminals.

CHM' of FIG. 2 exhibits only two of these three modes, namely the first and the second modes.

f) The RMS magnitude of a periodically varying voltage is herein defined as the RMS magnitude as measured (i.e., integrated) over the duration of the period. This definition is in keeping with commonly accepted practice.

g) It is believed that the present invention and its several attendant advantages and features will be understood from the preceeding description. However, without departing from the spirit of the invention, changes may be made in its form and in the construction and interrelationships of its component parts, the form herein presented merely representing the presently preferred embodiment.

I claim:
1. An arrangement comprising:
a power line providing a power line voltage between a first and a second power line terminal;
a gas discharge lamp means having a first and a second lamp terminal;
first reactor means connected between the first power line terminal and the first lamp terminal; thereby, substantially regardless of the temperature of the first reactor means, to establish a first voltage between the first power line terminal and the first lamp terminal whenever current flows between the lamp terminals; and
second reactor means connected between the second power line terminal and the second lamp terminal; thereby, substantially regardless of the temperature of the second reactor means, to establish a second voltage between the second power line terminal and the second lamp terminal whenever current flows between the lamp terminals.

2. The arrangement of claim 1 including control means connected between the lamp terminals; the control means being operative at certain times to cause a short circuit to be placed across the lamp terminals.

3. The arrangement of claim 1 including control means connected between the lamp terminals; the control means being operative, but only under certain conditions, to cause a short circuit to occur between the lamp terminals in an intermittent and periodic manner.

4. The arrangement of claim 1 including control means connected with the lamp terminals and operative, in case the lamp means were to have become inoperable, to provide an intermittently interrupted short circuit thereacross.

5. The arrangement of claim 4 wherein the short circuit is provided periodically at a frequency substantially lower than the frequency of the power line voltage.

6. The arrangement of claim 1 wherein: (i) the first reactance means has a reactance of a first magnitude; (ii) the second reactance means has a reactance of a second magnitude; and (iii) the second magnitude is about equal to the first magnitude.

7. The arrangement of claim 1 wherein the magnitude of any voltage existing between the first power line terminal and the first lamp terminal is approximately equal to the magnitude of any voltage existing between the second lamp terminal and the second power line terminal.

8. An arrangement comprising:
source means providing an AC source voltage at a pair of AC source terminals;
gas discharge lamp means having a pair of cathodes and a pair of lamp terminals; each cathode being connected with one of the lamp terminals; and
control and circuit means connected with the AC source terminals and operable to provide an AC output voltage between a pair of AC output terminals; the AC output terminals being operable to connect with the lamp terminals; the AC output voltage having an RMS voltage that: (i) is substantially constant whenever the gas discharge lamp is indeed connected with, and draws a lamp current of sufficient magnitude from, the AC output terminals; and (ii) varies periodically at a relatively low repetition rate between a relatively high level and a relatively low level whenever the gas discharge lamp means is not connected with, or fails to draw a lamp current of sufficient magnitude from, the AC output terminals, the relatively low repetition rate being substantially lower than the fundamental frequency of the AC source voltage.

9. The arrangement of claim 8 wherein the fundamental frequency of the AC output voltage is the same as that of the AC source voltage.

10. The arrangement of claim 8 wherein: (i) at least one of the cathodes has a pair of cathode power input terminals; and (ii) the control and circuit means includes a pair of cathode power output terminals operable to connect with the cathode power input terminals and to provide a cathode heating voltage thereto.

11. The arrangement of claim 10 wherein the cathode heating voltage is provided even during such times as when the RMS magnitude of the AC output voltage is substantially constant.

12. The arrangement of claim 8 wherein the repetion rate is between 0.02 cycles per second and 20 cycles per second.

13. The arrangement of claim 8 wherein the relatively low level represents an RMS magnitude that is lower than half of the RMS magnitude represented by the relatively high level.

14. An arrangement comprising:
source means providing an AC source voltage at a pair of AC source terminals;
gas discharge lamp means having a pair of cathodes and a pair of lamp terminals; each cathode being connected with one of the lamp terminals; and
control and circuit means connected with the AC source terminals and operable to provide an AC output voltage between a pair of AC output terminals; the AC output terminals being operable to connect with the lamp terminals; the AC output voltage having an RMS magnitude that: (i) is substantially constant whenever the gas discharge lamp is indeed connected with, and draws a lamp current of sufficient magnitude from, the AC output terminals; and (ii) is amplitude-modulated at a relatively low frequency whenever the gas discharge lamp means is not connected with, or fails to draw a lamp current of sufficient magnitude from, the AC output terminals, the amplitude modulation being of a frequency between 0.02 Hz and 20 Hz.

15. The arrangement of claim 14 wherein: (i) at least one of the cathodes has a pair of cathode terminals; and (ii) the control and circuit means includes means operable to provide a cathode heating voltage across the cathode terminals even during periods when the RMS magnitude of the AC output voltage is substantially constant.

16. A control means having a pair of input terminals operative to be connected across a source of current-limited voltage, thereby to establish an input voltage across the input terminals; the control means comprising:
   semiconductor means connected in circuit with the input terminals and operative: (i) to sense the presence of the input voltage thereacross; (ii) as a first delayed response to the presence of the input voltage, to cause an effective short circuit to be established between the input terminals, thereby to cause the magnitude of the input voltage to diminish substantially; and (iii) as a second delayed response to the presence of the input voltage, to remove the effective short circuit some time period after is was established;
   the control means being characterized by being functional as defined even if having but two input terminals.

17. The control means of claim 16 additionally comprising a set of control input terminals connected with the semiconductor means and operative, on receipt of a control signal, to prevent the short circuit from being established.

18. The control means of claim 17 wherein the control input terminals comprises two separate signal input channels, and where the control signal comprises two separate signal components, one for each input channel.

19. The control means of claim 16 additionally comprising a set of output terminals connected in circuit with the semiconductor means and operative to provide an output voltage thereacross for as long as an effective short circuit exists between the input terminals.

20. A control means having a pair of input terminals operable to be connected across a pair of output terminals across which is provided a current-limited output voltage; the control means comprising:
   first semiconductor means connected in circuit with the input terminals and operative to sense the presence of the output voltage thereacross and, as a first response thereto, to cause an effective short circuit to be established therebetween, thereby to reduce the magnitude of the output voltage to a substantial degree; and
   second semiconductor means connected in circuit with the input terminals and operative to sense the presence of the output voltage thereacross and, as a second response thereto, to remove the effective short circuit some time period after it was established.

21. A combination comprising:
   a source providing a current-limited output voltage across a pair of output terminals; and
   control means having a pair of input terminals connected with the output terminals and operative, in response to the provision of a control signal at a pair of control terminals, to cause a short circuit to be provided between the input terminals, thereby to cause the magnitude of the output voltage to be substantially reduced while at the same time causing a short circuit current to be drawn from the output terminals; the control means being characterized by including a pair of transistors which, in response to the control signal, conducts alternatingly and periodically at a frequency substantially higher than that of the power line voltage on an ordinary electric utility power line.

22. The combination of claim 21 wherein the output voltage is an alternating voltage.

* * * * *